(12) United States Patent
Cantley et al.

(10) Patent No.: US 11,055,145 B2
(45) Date of Patent: Jul. 6, 2021

(54) SYSTEM FOR GENERATION AND MAINTENANCE OF NESTED HIERARCHICAL RESOURCE MODULES

(71) Applicant: BANK OF AMERICA CORPORATION, Charlotte, NC (US)

(72) Inventors: Kerry Michelle Cantley, Fort Mill, SC (US); Katherine Dintenfass, Lincoln, RI (US); Heather Roseann Dolan, Sarasota, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 93 days.

(21) Appl. No.: 16/444,014

(22) Filed: Jun. 18, 2019

(65) Prior Publication Data
US 2020/0401453 A1 Dec. 24, 2020

(51) Int. Cl.
*G06F 9/50* (2006.01)
*G06F 12/08* (2016.01)

(52) U.S. Cl.
CPC .......... *G06F 9/5038* (2013.01); *G06F 9/5077* (2013.01); *G06F 12/08* (2013.01); *G06F 2209/5011* (2013.01)

(58) Field of Classification Search
CPC ...... G06F 9/5038; G06F 9/5077; G06F 12/08; G06F 2209/5011
See application file for complete search history.

(56) References Cited

U.S. PATENT DOCUMENTS

| | | | |
|---|---|---|---|
| 7,389,912 B2 | 6/2008 | Carlson et al. | |
| 8,065,230 B1 | 11/2011 | Little | |
| 8,249,985 B2 | 8/2012 | Giordano et al. | |
| 8,260,699 B2 | 9/2012 | Smith et al. | |
| 8,290,866 B1 | 10/2012 | Little | |
| 10,169,812 B1 | 1/2019 | Bajgier et al. | |
| 2012/0278235 A1* | 11/2012 | Kitchel | G06Q 40/02 705/44 |
| 2015/0095998 A1* | 4/2015 | Christmas | G06F 16/10 726/6 |
| 2015/0332246 A1* | 11/2015 | Lafeer | G06Q 20/405 705/44 |
| 2017/0216581 A1* | 8/2017 | Foreman | A61N 1/36114 |

\* cited by examiner

*Primary Examiner* — Sisley N Kim
(74) *Attorney, Agent, or Firm* — Michael A. Springs; Moore & Van Allen PLLC; Nicholas C. Russell

(57) ABSTRACT

Embodiments of the present invention provide a system for generation and maintenance of nested hierarchical resource modules. The system is configured for identifying one or more indicators associated with one or more resource pools of a user, generating one or more resource modules in the one or more resource pools of the user based on identifying the one or more indicators, automatically transferring resources to each of the one or more resource modules, identifying initiation of a resource interaction by the user, wherein the resource interaction is between the user and a third party entity, determining a type of the resource interaction and identify at least one resource module that is associated with the determined type, and transferring the resources from the at least one of the one or more resource modules to the third party entity.

20 Claims, 5 Drawing Sheets

SYSTEM FOR GENERATION AND MAINTENANCE OF NESTED HIERARCHICAL RESOURCE MODULES

BACKGROUND

Current systems do not have the capability to automatically generate resource modules and maintain the resources modules. As such, there exists a need for a system to generate and maintain resource modules.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for generation and maintenance of nested hierarchical resource modules. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies one or more indicators associated with one or more resource pools of a user, generates one or more resource modules in the one or more resource pools of the user based on identifying the one or more indicators, automatically transfer resources to each of the one or more resource modules, identifies initiation of a resource interaction by the user, wherein the resource interaction is between the user and a third party entity, determines a type of the resource interaction and identify at least one resource module that is associated with the determined type, and transfers the resources from the at least one of the one or more resource modules to the third party entity.

In some embodiments, the present invention automatically transfers resources to each of the one or more resource modules based on historical resource pool data that is associated with the one or more resource pools of the user.

In some embodiments, the present invention identifies that the resources in a first resource module of the one or more resource modules are below a first limit and automatically transfers resources from a second resource module of the one or more resource modules to the first resource module.

In some embodiments, the present invention automatically transfers resources from the second resource module to the first resource module based on identifying, via an artificial intelligence engine, that the resources in the second resource module are above a second limit and there are no upcoming interactions that are associated with the second resource module.

In some embodiments, the one or more resource modules are hierarchical resource modules.

In some embodiments, the present invention identifies that the resources in a first resource module are greater than a first limit after a first time period and transfers the resources from the first resource module to the hierarchical resource modules associated with the first resource module.

In some embodiments, the present invention identifies the one or more indicators based on monitoring user activity of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
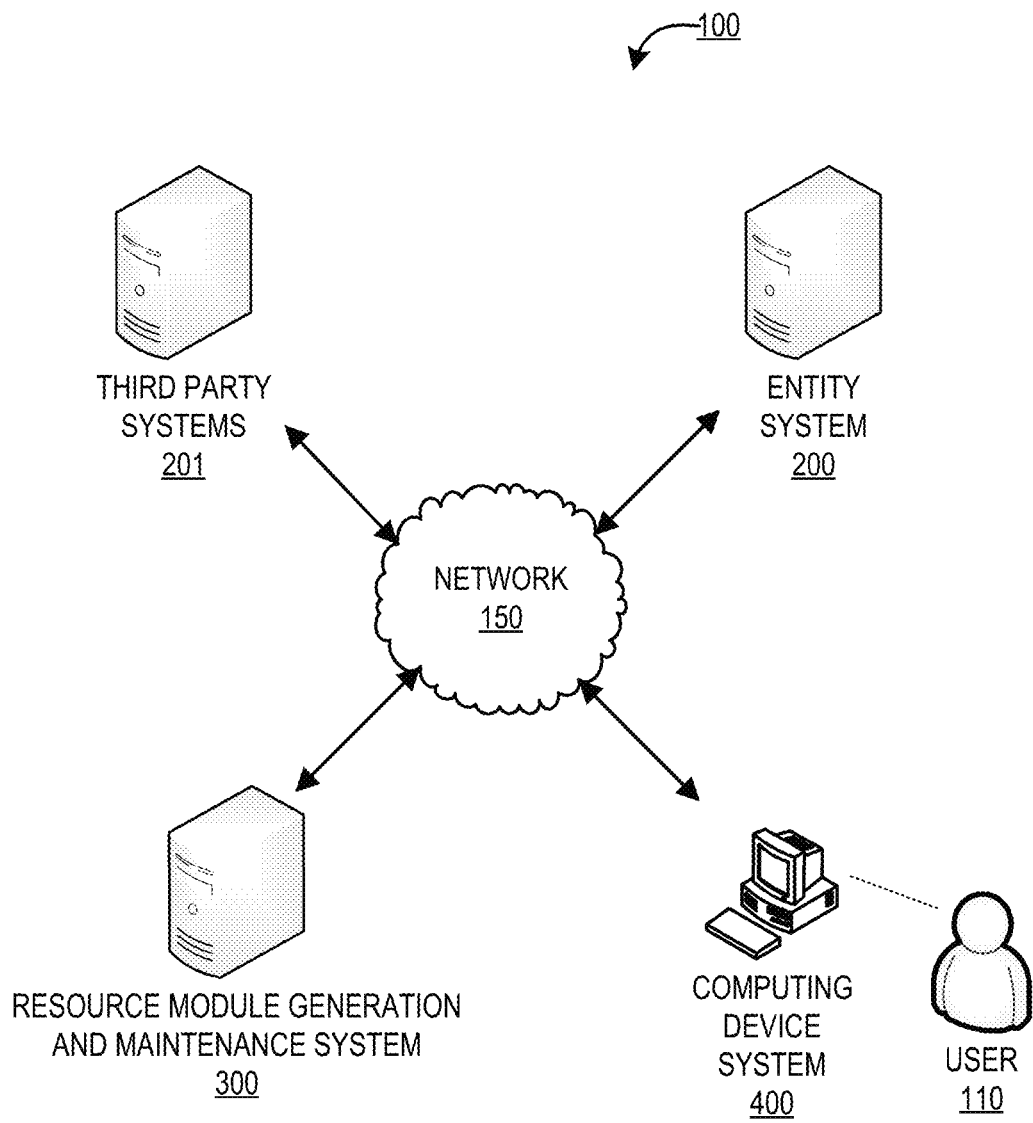
Figure 2:
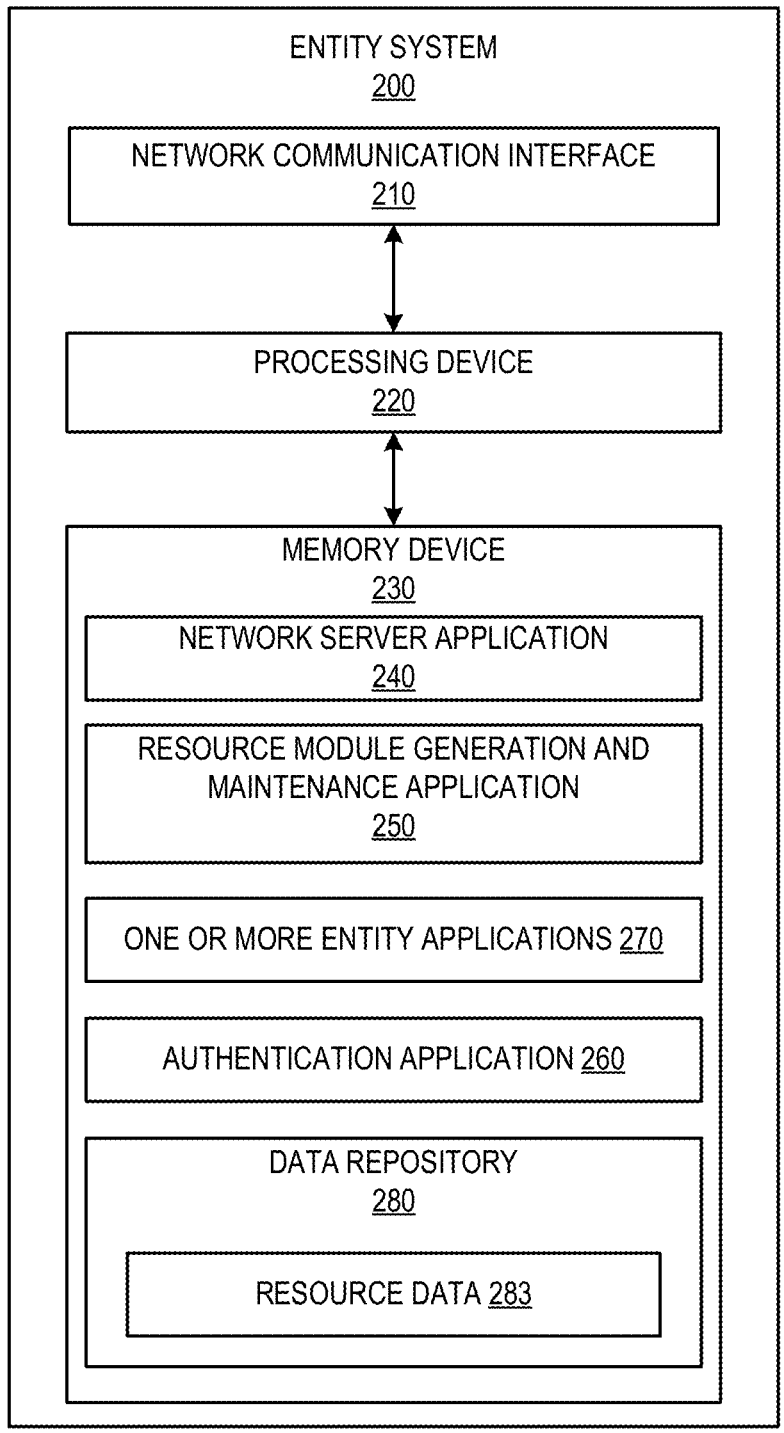
Figure 3:
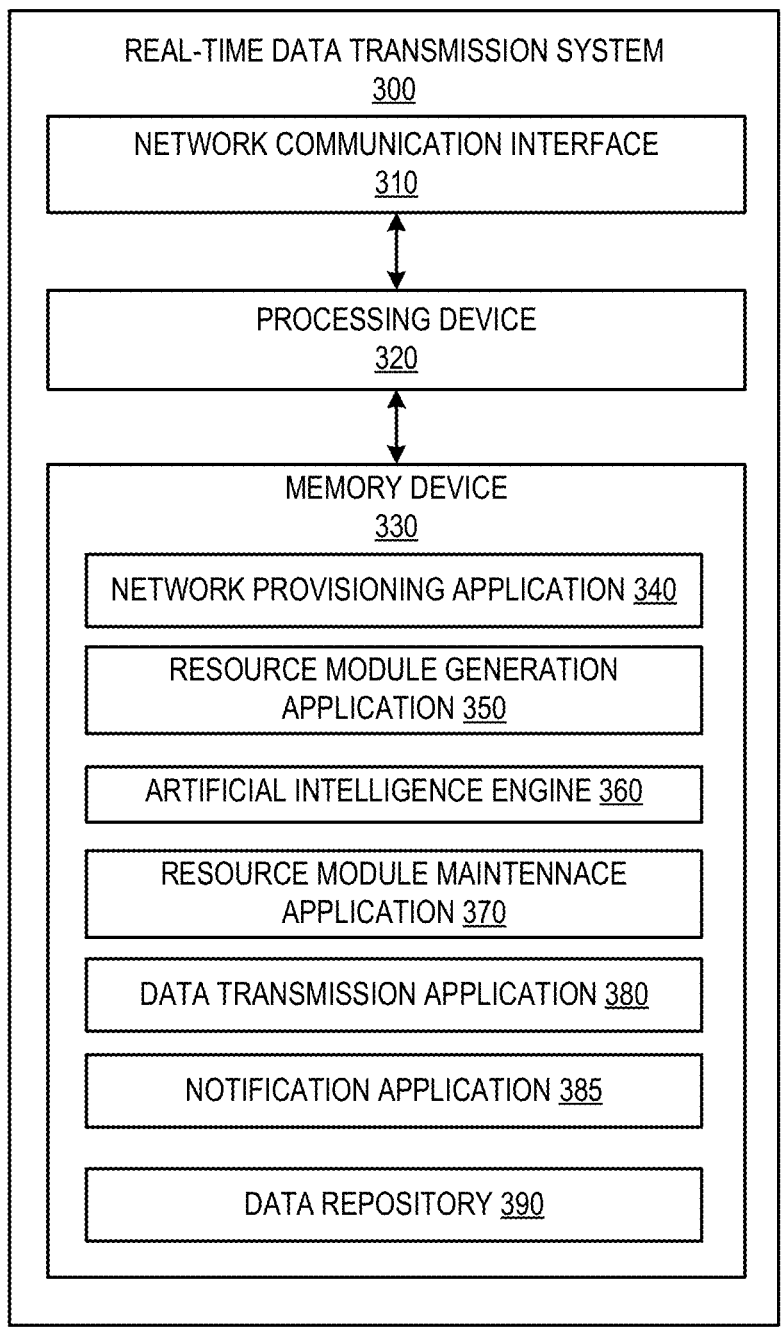
Figure 4:
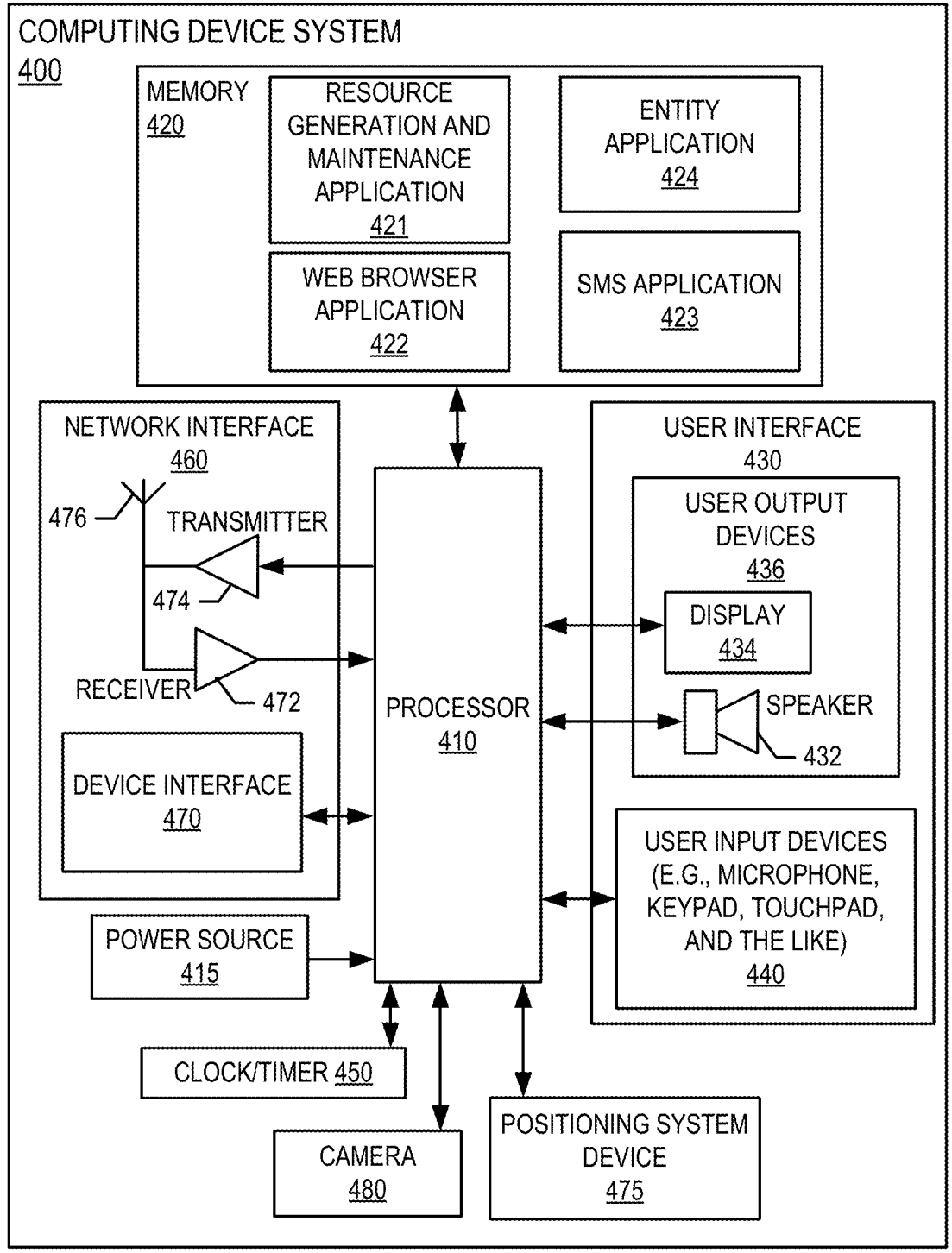
Figure 5:
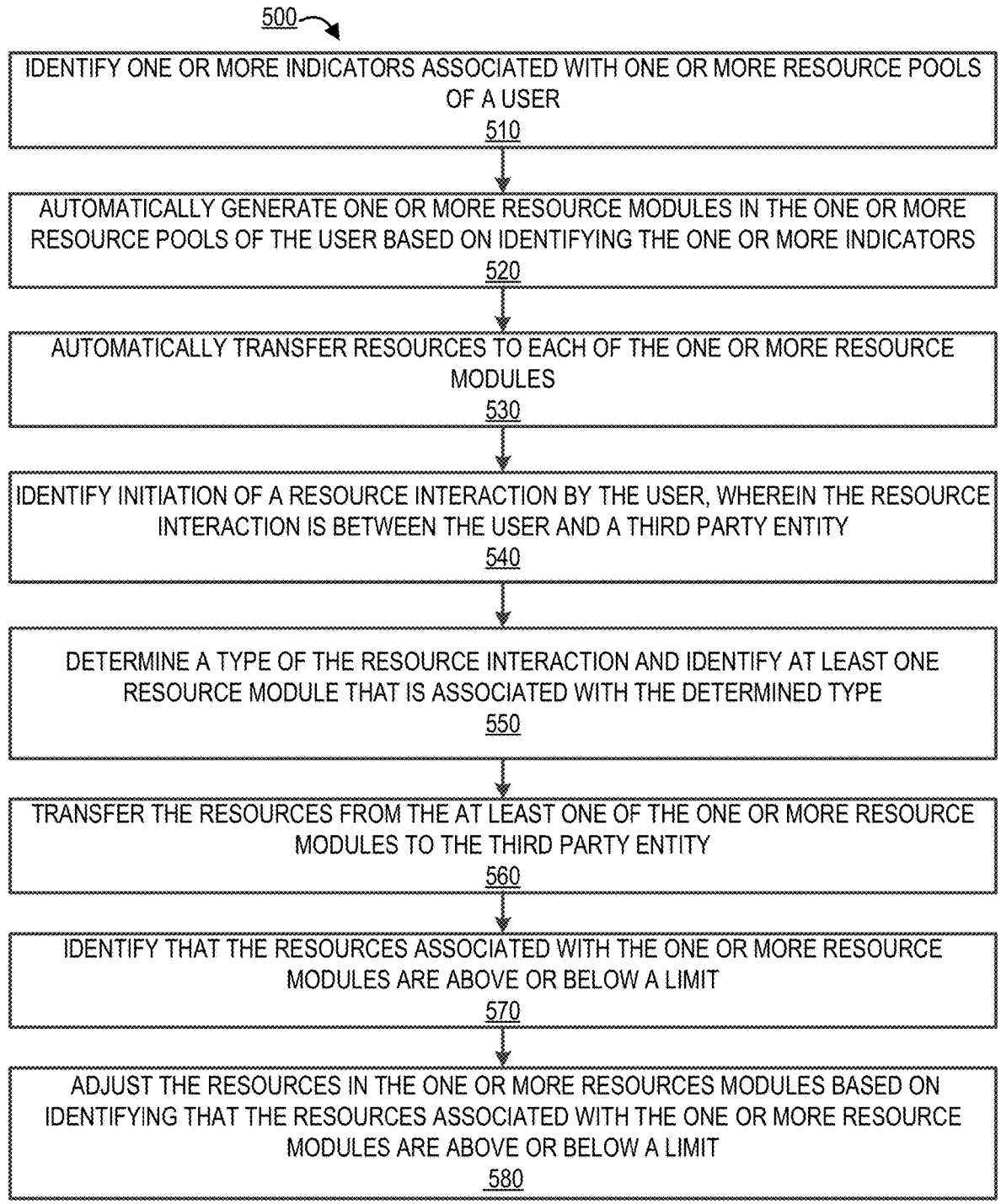

Having thus described embodiments of the invention in general terms, reference will now be made the accompanying drawings, wherein:

FIG. 1 provides a block diagram illustrating a system environment for generating and monitoring nested hierarchical resource modules, in accordance with an embodiment of the invention;

FIG. 2 provides a block diagram illustrating the entity system 200 of FIG. 1, in accordance with an embodiment of the invention;

FIG. 3 provides a block diagram illustrating a resource module generation and maintenance system 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for generating and maintaining resource modules, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, resource management firms, insurance companies and the like. In accordance with embodiments of the invention, the terms "third party system" and "other third party systems" may include any organizations that sell products, goods, services, or the like to one or more customers. In some embodiments, the third party system may be a merchant selling products. Furthermore, embodiments of the present invention use the term "user" or "customer." It will be appreciated by someone with ordinary skill in the art that the user or customer may be a customer of the financial institution or a potential customer of the financial institution or an employee of the financial institution.

In accordance with embodiments of the invention, a "resource pool" or an "account" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user datafile that includes information associated with the user, or the like. The account is associated with and/or maintained by the entity.

In accordance with embodiments of the invention, a "resource interaction" may be a transaction, transfer of funds, transfer of resources, and may refer to any activities or communication between a user and an entity, between an entity and a third party system, activities or communication between multiple entities, communication between technology application and the like. Transfer of resources may refer to a payment, processing of funds, international transfer of funds, purchase of goods or services, a return of goods or services, a payment transaction, a credit transaction, or other interactions involving user's resource or account. In accordance with embodiments of the invention, a "resource module," a "resource folder," or a "resource bucket" may be any folder or a bucket that holds resources in each of the resource pools of the one or more users associated with resource interactions specific to certain categories.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

FIG. 1 provides a block diagram illustrating a system environment 100 for navigating utilization of resources, in accordance with an embodiment of the invention. As illustrated in FIG. 1, the environment 100 includes a resource module generation and maintenance system 300, entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200.

The entity system(s) 200 may be any system owned or otherwise controlled by an entity to support or perform one or more process steps described herein. The entity may be any organization which develops or manages applications. In some embodiments, the managing entity is a financial institution. In some embodiments, the managing entity is a non-financial institution.

The resource module generation and maintenance system 300 is a system of the present invention for performing one or more process steps described herein. In some embodiments, the resource module generation and maintenance system 300 may be an independent system. In some embodiments, the resource module generation and maintenance system 300 may be a part of the entity system 200.

The resource module generation and maintenance system 300, the entity system 200, the computing device system 400, and/or the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the resource module generation and maintenance system 300 is configured to communicate information or instructions with the entity system 200, the computing device system 400, and/or the third party systems 201 across the network 150.

The computing device system 400 may be a system owned or controlled by the entity of the entity system 200, the user 110, and/or a third party that specializes in processing of the resource distribution applications in the system environment 100. As such, the computing device system 400 may be a computing device of the user 110. In general, the computing device system 400 communicates with the user 110 via a user interface of the computing device system 400, and in turn is configured to communicate information or instructions with the resource module generation and maintenance system 300, entity system 200, and/or the third party systems 201 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a resource module generation and maintenance application 250, one or more entity applications 270, an authentication application 260, and a data repository 280 comprising resource data 283 and user data (not shown). The resource data 283 may comprise historical interaction data, resource pool data, or the like associated with one or more users. The user data may comprise personal information of the one or more users, or the like. The computer-executable program code of the network server application 240, the resource module generation and maintenance application 250, the one or more entity applications 270, and the authentication application 260 to perform certain logic, data-extraction, and data-storing functions of the entity system 200 described herein, as well as communication functions of the entity system 200.

The network server application 240, the resource module generation and maintenance application 250, the one or more entity applications 270, and the authentication application 260 are configured to store data in the data repository 280 or to use the data stored in the data repository 280 when communicating through the network communication interface 210 with the resource module generation and maintenance system 300, the computing device system 400, and/or the third party systems 201 to perform one or more process steps described herein. In some embodiments, the entity system 200 may receive instructions from the resource module generation and maintenance system 300 via the resource module generation and maintenance application 250 to perform certain operations. The resource module generation and maintenance application 250 may be provided by the resource module generation and maintenance system 300. The one or more entity applications 270 may be any of the applications used, created, modified, and/or managed by the entity system 200. The authentication application 260 may be used to authenticate one or more users 110 to access the one or more entity applications 270 and the data repository 280.

FIG. 3 provides a block diagram illustrating the resource module generation and maintenance system 300 in greater detail, in accordance with embodiments of the invention. As illustrated in FIG. 3, in one embodiment of the invention, the resource module generation and maintenance system 300 includes one or more processing devices 320 operatively coupled to a network communication interface 310 and a memory device 330. In certain embodiments, the resource module generation and maintenance system 300 is operated by a first entity, such as a financial institution, while in other embodiments, the resource module generation and maintenance system 300 is operated by an entity other than a financial institution. In some embodiments, the resource module generation and maintenance system 300 is owned or operated by the entity of the entity system 200. In some embodiments, the resource module generation and maintenance system 300 may be an independent system. In alternate embodiments, the resource module generation and maintenance system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the resource module generation and maintenance system 300 described herein. For example, in one embodiment of the resource module generation and maintenance system 300, the memory device 330 includes, but is not limited to, a network provisioning application 340, a resource module generation application 350, an artificial intelligence engine 360, a resource module maintenance application 370, a data transmission application 380, a notification application 385, and a data repository 390 comprising data processed or accessed by one or more applications in the memory device 330. The computer-executable program code of the network provisioning application 340, the resource module generation application 350, the artificial intelligence engine 360, the resource module maintenance application 370, the data transmission application 380, and the notification application 385 may instruct the processing device 320 to perform certain logic, data-processing, and data-storing functions of the resource module generation and maintenance system 300 described herein, as well as communication functions of the resource module generation and maintenance system 300.

The network provisioning application 340, the resource module generation application 350, the artificial intelligence engine 360, the resource module maintenance application 370, the data transmission application 380, and the notification application 385, are configured to invoke or use the data in the data repository 390 when communicating through the network communication interface 310 with the entity system 200, the computing device system 400, and/or the third party systems 201. In some embodiments, the network provisioning application 340, the resource module generation application 350, the artificial intelligence engine 360, the resource module maintenance application 370, the data transmission application 380, and the notification application 385 may store the data extracted or received from the entity system 200, the third party system 201, and the computing device system 400 in the data repository 390. In some embodiments, the network provisioning application 340, the resource module generation application 350, the artificial intelligence engine 360, the resource module maintenance application 370, the data transmission application 380, and the notification application 385 may be a part of a single application.

In some embodiments, the network provisioning application 340, the resource module generation application 350, the artificial intelligence engine 360, the resource module maintenance application 370, the data transmission application 380, and the notification application 385 may be responsible for performing one or more steps described in process flow 500 of FIG. 5.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a resource generation and maintenance application 421, entity application 424. These applications also typically instructions to a graphical user interface (GUI) on the display 430 that allows the user 110 to interact with the entity system 200, the resource module generation and maintenance system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the resource generation and maintenance application 421 provided by the resource module generation and maintenance system 300 allows the user 110 to access the one or more electronic resources stored in the entity system and/or the resource module generation and maintenance system 300. In some embodiments, the entity application 424 provided by the entity system 200 and the resource generation and maintenance application 421 allow the user 110 to access one or more electronic resources and one or more entity applications 270.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for generating and maintaining resource modules, in accordance with an embodiment of the invention. The resources modules may be associated with resource pools (accounts) of an individual user or a business. As shown in block 510, the system identify one or more indicators associated with one or more resource pools of a user. In some embodiments, the one or more indicators based be based on inputs received from the user. In some embodiments, the system may identify the one or more indicators based on monitoring user activity. Monitoring user activity may comprise monitoring location of the user, monitoring transactions, monitoring emails or other electronic content associated with the user via one or more applications stored in the user device of the user, or the like. In such embodiment, the one or more indicators may include, but are not limited to, an indication that the user is saving to buy a house, an indication that the user is saving to buy a car, or the like. In some embodiments, the system may identify one or more indicators based on the historical resource interaction data or resource pool data associated with the account of the user.

As shown in block 520, the system automatically generate one or more resource modules in the one or more resource pools of the user based on identifying the one or more indicators. The resource modules may folders or buckets that are generated within a resource pool or an account of the user. In some embodiments, the resource modules may be associated with each of the one or more indicators. In some embodiments, the resource modules may be generated based on resource pool data associated with the one or more resource pools of the user. For example, the system may classify resource interactions associated with the one or more resource pools of the user and identify one or more categories associated with the resource interactions. The system may generate resource modules for each of the one or more categories. In some embodiments, the one or more resource modules may be nested hierarchical resource modules. For example, the system may generate a folder for monthly transactions and may create subfolders for groceries, gas, entertainment, or the like based on the historical transaction data associated with the user.

As shown in block 530, the system automatically transfer resources to each of the one or more resource modules. The system may automatically calculate and transfer resources based on the historical resource interaction data associated with the one or more resource pools. For example, the system may calculate that the user typically spends $X on category 'A' associated with resource pool 'A' and may transfer resources based on the calculation.

As shown in block 540, the system identifies initiation of a resource interaction by the user, wherein the resource interaction is between the user and a third party entity. As shown in block 550, the system determines a type of the resource interaction and identify at least one resource module that is associated with the determined type. The system may identify the type of the resource interaction based on the third party entity. As shown in block 560, the system transfers the resources from the at least one of the one or more resource modules to the third party entity. For example, if the user is initiating a transaction with a merchant that sells gas, the system may classify the transaction as a transaction that is related to fuel category and may transfer funds stored in the fuel folder to the merchant.

The system may also maintain the one or more resource modules as explained below. As shown in block 570, the system identifies that the resources associated with the one or more resource modules are above or below a limit. As shown in block 580, the system adjust the resources in the one or more resources modules based on identifying that the resources associated with the one or more resource modules are above or below a limit. The adjustment of resources may be based on hierarchy of the one or more resource modules.

In one exemplary embodiment, during a time period the system may identify that resources in a first resource module is below a first limit and may automatically transfer resources from a second resource module to the first resource module. For example, the system may identify that the funds in "grocery" bucket are zero and may transfer funds from a "miscellaneous" bucket to the "grocery" bucket. The system may choose the second resource module based on the amount of resources available in each of the resource modules and the resource interaction history associated with each of the resource modules. For example, if a second bucket has $X funds and if there are no scheduled transactions or upcoming transactions for that month, the system may transfer funds from the second bucket to other buckets. The system may also determine that there will be no transactions associated with the second bucket for that month based on the transaction history before initiating the transfer of funds from the second bucket.

In another exemplary embodiment, the system may identify that at the end of a time period (e.g., a month), the resources in a first resource module are greater than a predetermine limit and may initiate transfer of resources from the first resource module to other resource modules. For example, at the end of the month, the system may identify the funds in the "fuel" bucket are greater than zero and may transfer the funds to "car savings" bucket. In some embodiments, the transfer or adjustment of resources in the one or more resource modules may be based on hierarchy of the one or more resource modules. In some embodiments, the maintenance of the resource modules (e.g., transfer or adjustment of resources) may be based on a set of rules. In some such embodiments, the set of rules may be based on the input received from the user. In some other embodiments, the system may automatically formulate a set of rules based on the historical interaction data.

In some embodiments, the system may automatically set interaction limits to each of the one or more resource modules and may transmit notifications to the user if the interaction limits are met. In some embodiments, a user may set the interaction limits. For example, the system may set a purchase limit on the "entertainment" bucket based on the input received from the user.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for generation and maintenance of nested hierarchical resource modules, the system comprising: at least one transitory storage device; and at least one processing device coupled to the at least one non-transitory storage device, wherein the at least one processing device is configured to: identify one or more indicators associated with one or more resource pools of a user; generate one or more resource modules in the one or more resource pools of the user based on identifying the one or more indicators, wherein the one or more resource modules are hierarchical resource modules; automatically transfer resources to each of the one or more resource modules; identify initiation of a resource interaction by the user, wherein the resource interaction is between the user and a third party entity; determine a type of the resource interaction and identify at least one resource module that is associated with the determined type; transfer the resources from the at least one of the one or more resource modules to the third party entity, identify that the resources in a first resource module of the one or more resource modules are greater than a first limit after a first time period; and transfer the resources from the first resource module to each of the hierarchical resource modules associated with the first resource module based on historical resource pool data.

2. The system of claim 1, wherein the at least one processing device is further configured to automatically transfer the resources to each of the one or more resource modules based on historical resource pool data that is associated with the one or more resource pools of the user.

3. The system of claim 1, wherein the at least one processing device is further configured to:
identify that the resources in the first resource module of the one or more resource modules are below a predefined limit; and
automatically transfer the resources from a second resource module of the one or more resource modules to the first resource module.

4. The system of claim 3, wherein the at least one processing device is further configured to automatically transfer the resources from the second resource module to the first resource module based on identifying, via an artificial intelligence engine, that the resources in the second resource module are above a second limit and there are no upcoming interactions that are associated with the second resource module.

5. The system of claim 1, wherein the at least one processing device is further configured to identify the one or more indicators based on monitoring user activity of the user.

6. The system of claim 1, wherein the at least one processing device is further configured to identify the one or more indicators based on an input received from the user.

7. The system of claim 1, wherein the one or more resource modules are buckets within the one or more resource pools.

8. A computer program product for generation and maintenance of nested hierarchical resource modules, the computer program product comprising a non-transitory computer-readable storage medium having computer executable instructions for causing a computer processor to perform the steps of: identifying one or more indicators associated with one or more resource pools of a user; generating one or more resource modules in the one or more resource pools of the user based on identifying the one or more indicators, wherein the one or more resource modules are hierarchical resource modules; automatically transferring resources to each of the one or more resource modules; identifying initiation of a resource interaction by the user, wherein the resource interaction is between the user and a third party entity; determining a type of the resource interaction and identify at least one resource module that is associated with the determined type; transferring the resources from the at least one of the one or more resource modules to the third party entity, identifying that the resources in a first resource module of the one or more resource modules are greater than a first limit after a first time period; and transferring the resources from the first resource module to each of the hierarchical resource modules associated with the first resource module based on historical resource pool data.

9. The computer program product of claim 8, wherein the computer executable instructions cause the computer processor to automatically transfer the resources to each of the one or more resource modules based on historical resource pool data that is associated with the one or more resource pools of the user.

10. The computer program product of claim 8, wherein the computer executable instructions cause the computer processor to:
identify that the resources in the first resource module of the one or more resource modules are below a predefined limit; and
automatically transfer the resources from a second resource module of the one or more resource modules to the first resource module.

11. The computer program product of claim 10, wherein the computer executable instructions cause the computer processor to automatically transfer the resources from the second resource module to the first resource module based on identifying, via an artificial intelligence engine, that the resources in the second resource module are above a second limit and there are no upcoming interactions that are associated with the second resource module.

12. The computer program product of claim 8, wherein the computer executable instructions further cause the computer processor to identify the one or more indicators based on monitoring user activity of the user.

13. The computer program product of claim 8, wherein the computer executable instructions further cause the computer processor to identify the one or more indicators based on an input received from the user.

14. A computerized method for generation and maintenance of nested hierarchical resource modules, the method comprising: identifying one or more indicators associated with one or more resource pools of a user; generating one or more resource modules in the one or more resource pools of the user based on identifying the one or more indicators, wherein the one or more resource modules are hierarchical resource modules; automatically transferring resources to each of the one or more resource modules; identifying initiation of a resource interaction by the user, wherein the resource interaction is between the user and a third party entity; determining a type of the resource interaction and identify at least one resource module that is associated with the determined type; transferring the resources from the at least one of the one or more resource modules to the third party entity, identifying that the resources in a first resource module of the one or more resource modules are greater than a first limit after a first time period; and transferring the resources from the first resource module to each of the hierarchical resource modules associated with the first resource module based on historical resource pool data.

15. The computerized method of claim 14, wherein automatically transferring the resources to each of the one or more resource modules is based on historical resource pool data that is associated with the one or more resource pools of the user.

16. The computerized method of claim 14, wherein the method further comprises:
   identifying that the resources in the first resource module of the one or more resource modules are below a predefined limit; and
   automatically transferring the resources from a second resource module of the one or more resource modules to the first resource module.

17. The computerized method of claim 16, wherein automatically transferring the resources from the second resource module to the first resource module is based on identifying, via an artificial intelligence engine, that the resources in the second resource module are above a second limit and there are no upcoming interactions that are associated with the second resource module.

18. The computerized method of claim 14, wherein the method of identifying the one or more indicators is based on monitoring user activity of the user.

19. The computerized method of claim 14, wherein the method of identifying the one or more indicators is based on an input received from the user.

20. The computerized method of claim 14, wherein the one or more resource modules are buckets within the one or more resource pools.

* * * * *